United States Patent [19]
Kobayashi

[11] Patent Number: 5,926,335
[45] Date of Patent: *Jul. 20, 1999

[54] METHOD AND APPARATUS OF LOADING A CASSETTE TAPE WHICH HAS A DETECTABLE END

[75] Inventor: Junji Kobayashi, Tokyo, Japan

[73] Assignee: Canon Kabushiki Kaisha, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/589,477

[22] Filed: Jan. 22, 1996

[30] Foreign Application Priority Data

Jan. 31, 1995 [JP] Japan .................................. 7-014197

[51] Int. Cl.$^6$ .................................................. G11B 15/08
[52] U.S. Cl. .................. 360/74.4; 360/74.5; 360/74.6
[58] Field of Search ...................... 360/71, 74.1, 74.5, 360/74.6, 85, 75; 242/338, 343, 343.2

[56] References Cited

U.S. PATENT DOCUMENTS

| | | |
|---|---|---|
| 4,370,682 | 1/1983 | Katoh ........................................ 360/71 |
| 4,636,887 | 1/1987 | Kato et al. ............................. 360/71 X |
| 4,991,039 | 2/1991 | Kaku .................................. 360/74.1 X |
| 5,251,080 | 10/1993 | Matsuoka et al. ....................... 360/85 |
| 5,343,339 | 8/1994 | Inoue et al. .............................. 360/71 |
| 5,692,696 | 12/1997 | Kobayashi ......................... 360/74.6 X |
| 5,699,206 | 12/1997 | Minabe et al. .......................... 360/74.6 |
| 5,739,970 | 4/1998 | Kobayashi et al. ....................... 360/75 |

*Primary Examiner*—Aristotelis M. Psitos
*Assistant Examiner*—K. Wong
*Attorney, Agent, or Firm*—Fitzpatrick, Cella, Harper & Scinto

[57] ABSTRACT

Method and apparatus for loading a cassette tape which has a detectable end includes structure and steps for detecting the detectable end of the tape. Structure and steps are also provided for determining a specific point in the course of tape loading where the length of the tape drawn out of the cassette becomes shorter than the length of the tape capable of being drawn out of the cassette after the initiation of detecting the detectable end of the tape. Structure and steps are also provided for continuing the tape loading operation and stopping the tape end detection operation after the specific point on the tape is determined.

20 Claims, 10 Drawing Sheets

METHOD AND APPARATUS OF LOADING A CASSETTE TAPE WHICH HAS A DETECTABLE END

BACKGROUND OF THE INVENTION

1. Field of the Invention

The present invention relates to a recording and/or reproducing apparatus in which a tape is drawn out of a cassette and loaded on a predetermined path, and more particularly, to a tape loading operation where the end of the tape is detected at the time of loading.

2. Description of the Related Art

Conventionally, in a VTR (Video Tape Recorder), a tape is drawn out of a cassette attached to the VTR and loaded on a predetermined path which has a rotating drum. In some VTRs, one of a pair of reel bases (with which a pair of reel bases are engaged) is fixed and the other reel base is not fixed so that the tape is drawn out of one reel side in the cassette at the time of the tape loading.

In such a configuration, when the end of the tape is detected at one of the reels in the course of loading, it is judged that the tape which can be drawn out of the cassette is run out. In this case, the tape loading is stopped or the tape is unloaded once, and fixing of one reel base is released to draw the tape out of the one reel side, thereby performing the loading again. According to such a loading method as described above, the loading time may be prolonged.

In some VTRs as described above, a moving chassis to which the cassette is attached is allowed to reciprocate with respect to a fixed chassis which has a rotating drum for the sake of reduction in size, and the moving chassis is moved forward in the direction of the rotating drum. Particularly, in some such VTRs, the moving chassis protrudes from an opening of an apparatus enclosure when the cassette is attached thereto and moved forward so as to be stored in the apparatus enclosure. Then, the enclosure cover (which opens and closes the opening in the apparatus enclosure) is closed by the user.

When such VTRs are used, however, the user often predicts the normal movement of the moving chassis and starts to close the enclosure cover immediately before the completion of forward movement of the moving chassis. In this case, according to the conventional configuration in which the tape loading operation is performed with the detection of the end of the tape as described above, the moving chassis stops or starts to move backward at the position where the end of the tape is detected immediately before the completion of forward movement of the moving chassis. Thus, the enclosure cover abuts against the moving chassis and the moving chassis is overloaded so that problems resulting in mechanism deformation and destruction may occur.

SUMMARY OF THE INVENTION

It is an object of the present invention to provide a recording and/or reproducing apparatus which can reduce a tape loading time.

It is another object of the present invention to solve problems such as mechanism deformation which occur by an operation with respect to detection of the end of the tape in the course of the tape loading.

According to one aspect of the invention, there is provided a method of loading a tape having a detectable end which comprises the steps of: setting a point in the course of a tape loading where the length of the tape to be newly drawn out of a cassette until the loading is completed becomes shorter than that of the tape capable of being drawn out of the cassette after the initiation of detecting the end of the tape; and continuing the tape loading regardless of detection of the end of the tape after the tape loading is started and the tape passes over the point in the course of the tape loading.

According to another aspect of the invention, there is provided an apparatus for recording and/or reproducing information with respect to a tape drawn out of a cassette which comprises: loading means for loading the tape in order to draw the tape out of the cassette and form a predetermined tape path; first detection means for detecting an end of the tape drawn out of the cassette; second detection means for detecting a specific condition in the course of a tape loading where the length of the tape drawn out of the cassette for forming the predetermined tape path becomes shorter than that of the tape capable of being drawn out of the cassette after the initiation of detecting the end of the tape by the first detection means; and control means for continuing the tape loading operation regardless of detection results by the first detection means after the loading of the tape is started by the loading means and the specific condition is detected by the second detection means.

Further objects, features, and advantages of the present invention will become apparent from the following description of the preferred embodiments with reference to the attached drawings.

DETAILED DESCRIPTION OF THE PREFERRED EMBODIMENTS

The preferred embodiments in which the present invention is applied to a VTR will now be described with reference to the accompanying drawings. Firstly, a first embodiment will be described with reference to FIGS. 1 to 6.

Figure 1:
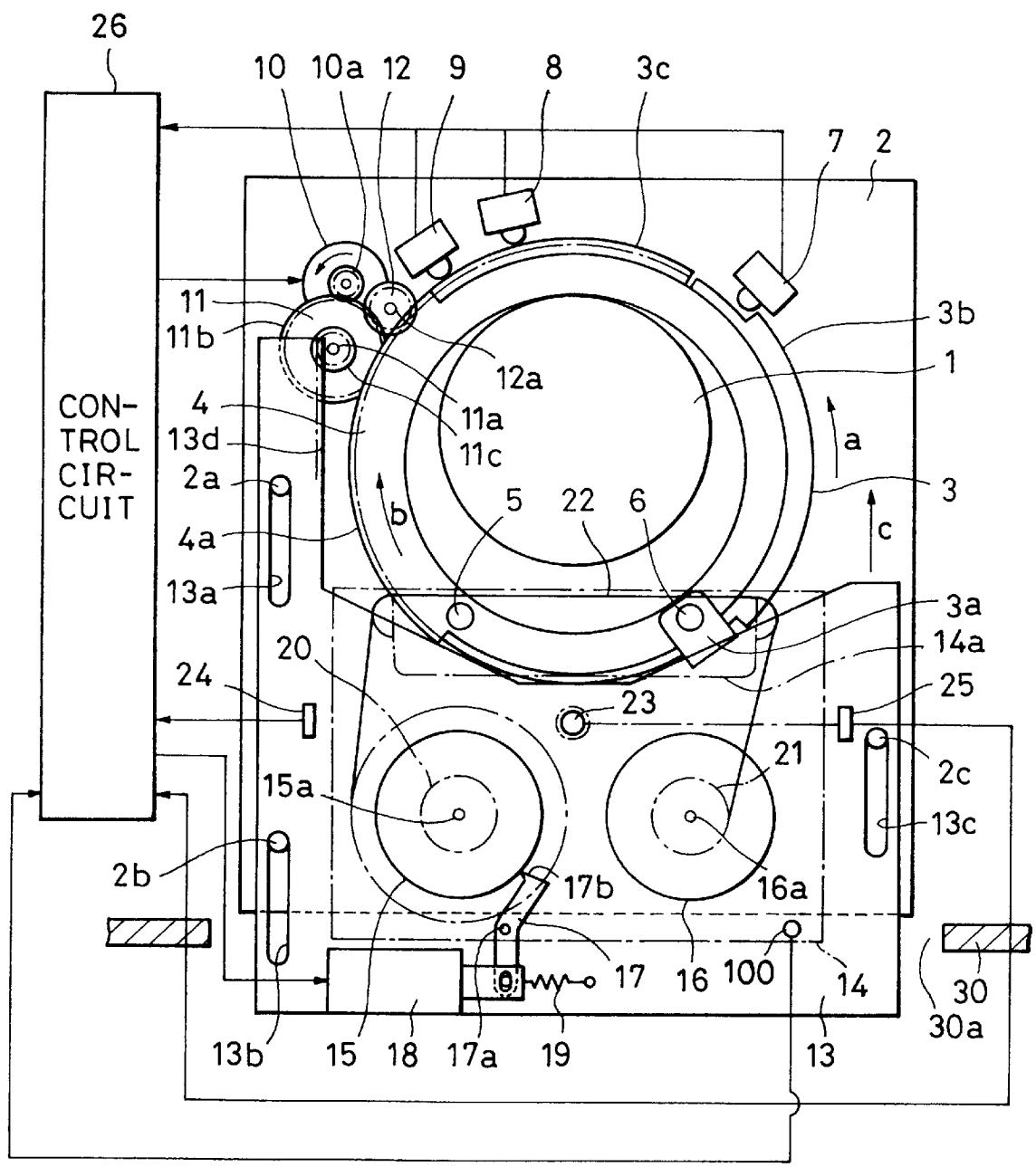
FIG. 1 is a plan view of the whole apparatus showing a state where a tape is unloaded according to a first embodiment in which the present invention is applied to a VTR.

FIG. 1 is a plan view of the apparatus showing a state where a tape is unloaded. Referring to FIG. 1, there is shown a rotating drum unit 1 having a magnetic head (not shown), and a fixed main chassis 2 on which the rotating drum unit 1 is mounted. A lower ring 3 and an upper ring 4 are concentrically provided on the main chassis 2 in such a way that they can be rotated. An incoming side post 5 is implanted in the upper ring 4 so as to be protruded therefrom, and an outgoing side post 6 is implanted in a stay portion 3a of the lower ring 3 extended above the upper ring 4 so as to be protruded therefrom. An outer peripheral portion 3b of the lower ring 3 protrudes outward along the predetermined length thereof, and sequentially abuts against an unload switch 7, an intermediate switch 8, and a load switch 9 due to rotation of the lower ring 3. Each of these switches are turned on when the tape is unloaded, turned on from the middle of tape loading, and turned on at the completion of the tape loading, respectively.

A loading motor 10 is installed on the main chassis 2, and a slide gear 11 composed of two gears 11b and 11c is provided on the main chassis 2 so as to be rotatable about a shaft 11a. A gear 10a of the loading motor 10 is meshed with a large gear portion 11b of the slide gear 11. The large gear portion 11b is meshed with an outer peripheral gear portion 3c of the lower ring 3 and also meshed with a load gear 12 which is provided on the main chassis so as to be rotatable about a shaft 12a. The load gear 12 is meshed with an outer peripheral gear portion 4a of the upper ring 4.

A slide chassis 13 on which a tape cassette 14 is attached can reciprocate with respect to the main chassis by slidably fitting guide slots 13a to 13c to guide shafts 2a to 2c. A rack portion 13d is formed at one side portion of the slide chassis 13 so as to be meshed with a small gear portion 11c of the slide gear 11.

A supply reel base 15 is provided on the slide chassis 13 so as to be rotatable about a shaft 15a, and similarly, a take-up reel base 16 is provided on the slide chassis 13 so as to be rotatable about a shaft 16a.

A brake lever 17 is provided on the slide chassis 13 so as to be rockable about a shaft 17a, and one end portion thereof abuts against the outer periphery of the supply reel base 15 so that it can stop the rotation of the supply reel base 15. The other end of the brake lever 17 is connected to a brake solenoid 18 provided on the slide chassis 13. When the solenoid 18 is not energized, the one end portion 17b abuts against the supply reel base 15 by a force of a brake spring 19 provided between the brake lever 17 and the slide chassis 13. When the solenoid is energized and drawn in, the one end portion 17b is separated from the supply reel base 15.

The tape cassette 14 is attached on the slide chassis 13, and a magnetic tape 22 is wound around a supply reel hub 20 and a take-up reel hub 21 contained in the tape cassette. The supply reel hub 20 and the take-up reel hub 21 can be fitted to the supply reel base 15 and the take-up reel base 16, respectively.

To an opening 14a of the cassette 14, the incoming side post 5 and outgoing side post 6 can be relatively inserted from below, and the tape 22 runs at the rotating drum 1 side which is the front of the opening 14a. With the rotation of the upper and lower rings 3 and 4, the incoming side post 5 and the outgoing side post 6 abut against the tape 22 so that they can draw the tape 22 out of the opening 14a.

A light emitting element 23 is provided on the slide chassis 13, and a supply end sensor 24 and take-up end sensor 25 are provided on the slide chassis 13 and are light receiving elements capable of receiving the light from the light emitting element 23. When the cassette 14 is attached on the slide chassis, the light emitted from the light emitting element 23 is cut off by the tape 22. A known light transmissive material is used to a portion of the tape 22 to be attached to the reel hubs 20 and 21 along the predetermined length thereof.

A control circuit 26 can control the loading motor 10 and the brake solenoid 18 and the like, and each of ON/OFF signals of the unload switch 7, intermediate switch 8 and load switch 9 and light detecting signals of the end sensors 24 and 25 are inputted therein.

In a state shown in FIG. 1 where the tape 22 is not loaded, the slide chassis 13 protrudes from an opening 30a of an apparatus enclosure 30. In a state of completion of tape loading (see FIG. 5) where the slide chassis 13 is moved into the apparatus enclosure 30, an enclosure cover 31 (which opens and closes the opening 30a) is closed by the user's operation.

Figure 2:
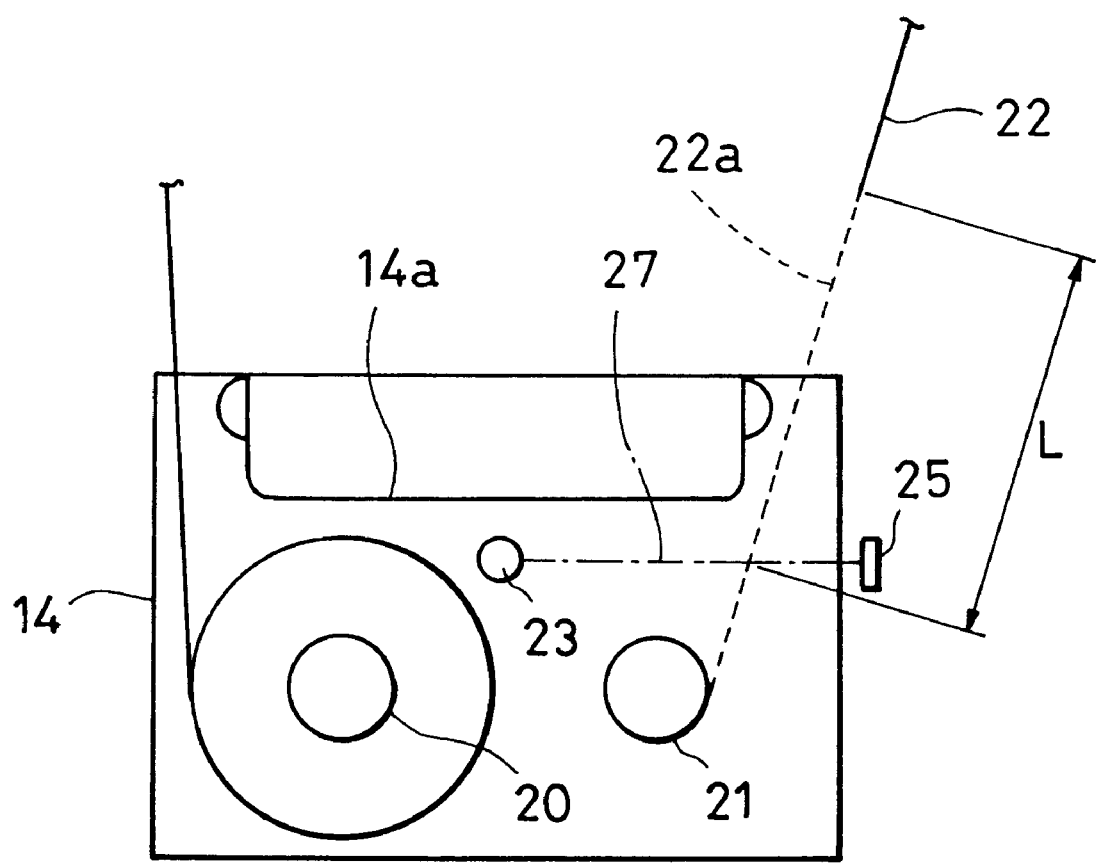
FIG. 2 is an explanatory view showing the end of the tape in a cassette to be used in the first embodiment of the present invention.

As described above, the predetermined length of the attaching portion of the tape 22 to be attached to the reel hub 21 is formed of a light transmissive material such as a transparent film, as shown by broken lines in FIG. 2, and the portion is called a leader tape 22a. From a point where a boundary between the tape 22 and the leader tape 22a passes over an optical axis obtained by connecting the light emitting element 23 and the light receiving element 25, the leader tape 22a can be detected as the end of the tape. However, the tape 22 can be actually drawn out of the cassette 14 by only the predetermined length L even after the end of the tape is detected. For example, the predetermined length L is about 50 mm at a minimum according to 8 mm VTR standards.

Figure 3:
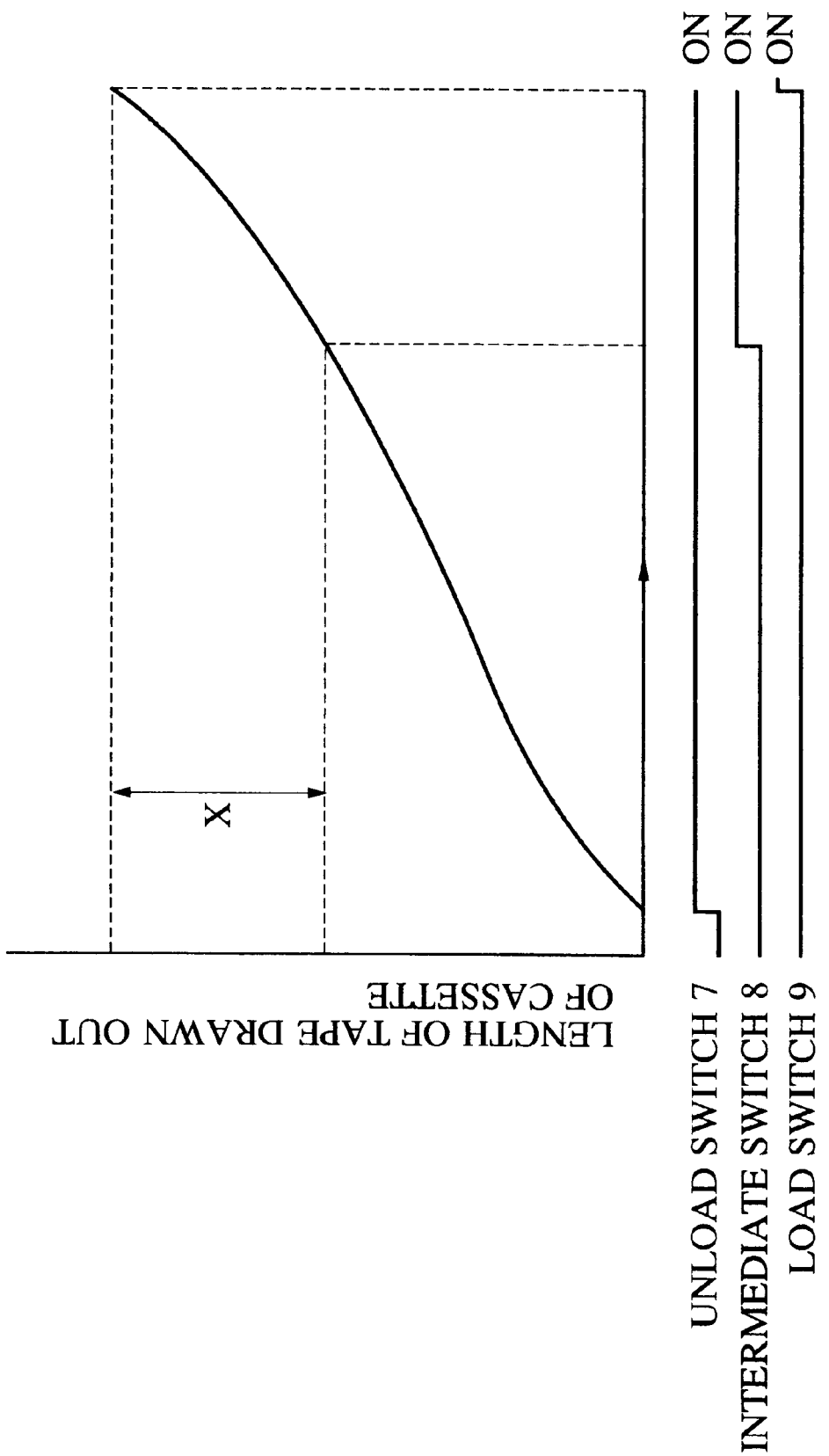
FIG. 3 is an explanatory view showing the relationship between tape loading positions (where switches are actuated) and a length of the tape drawn out of the cassette according to the first embodiment of the present invention.

On the other hand, according to this embodiment, the incoming side post 5 and the outgoing side post 6 draw the tape 22 out of the cassette 14 with the rotation of the upper and lower rings 3 and 4. The relationship between a length of the tape drawn out of the cassette and tape loading positions where the switches 7, 8 and 9 are actuated is as shown in FIG. 3. That is, in this embodiment, the length of the tape L which can be drawn out of the cassette 14 after the initiation of detecting the end of the tape in FIG. 2 and the length of the tape X which is newly drawn out of the cassette 14 by the completion of the tape loading after the actuation of the intermediate switch 8 in FIG. 3 are set to satisfy the formula:

$$X \leq L.$$

Figure 4:
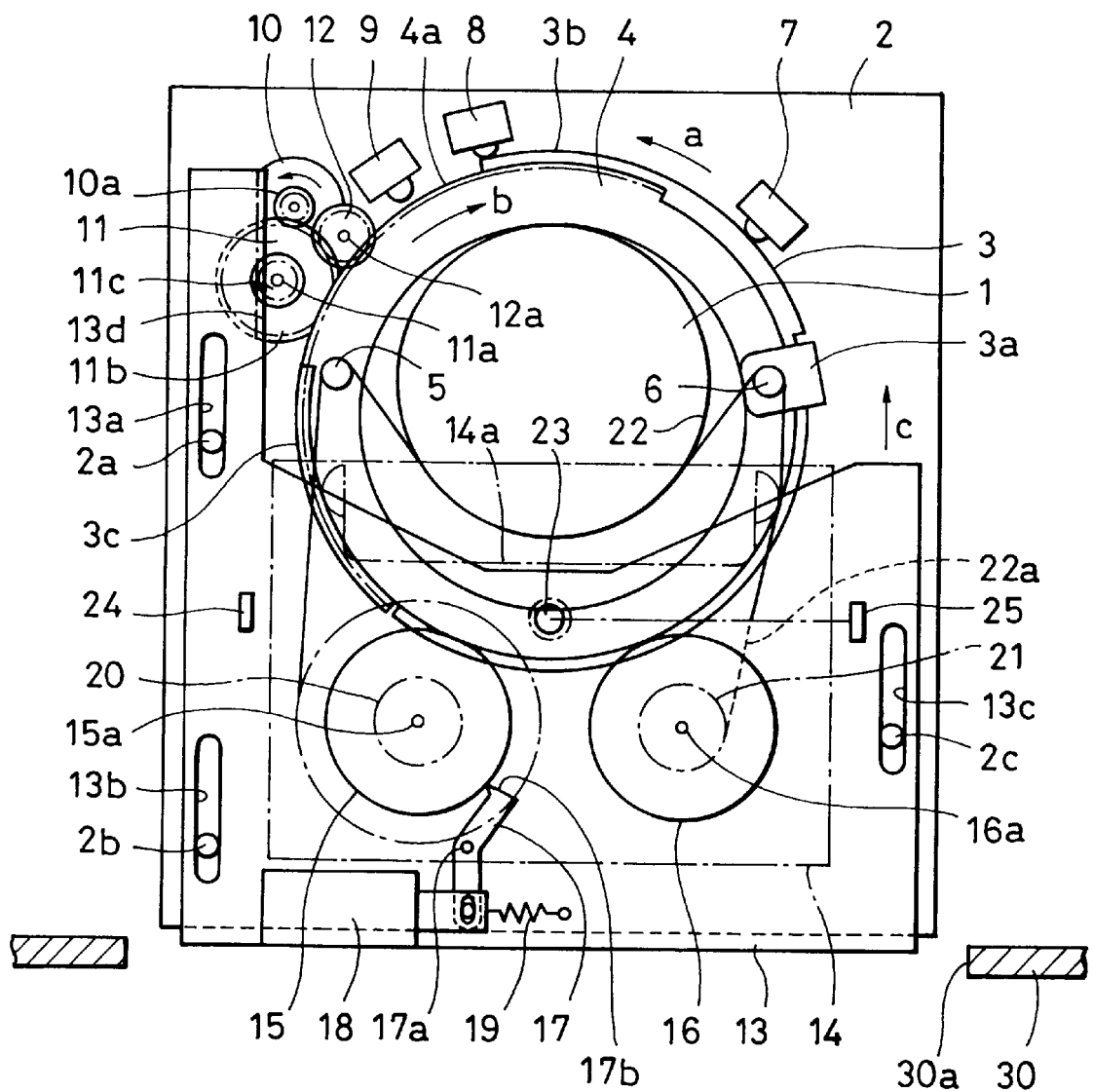
FIG. 4 is a plan view of the whole apparatus showing a state in the course of the tape loading according to the first embodiment of the present invention.
Figure 5:
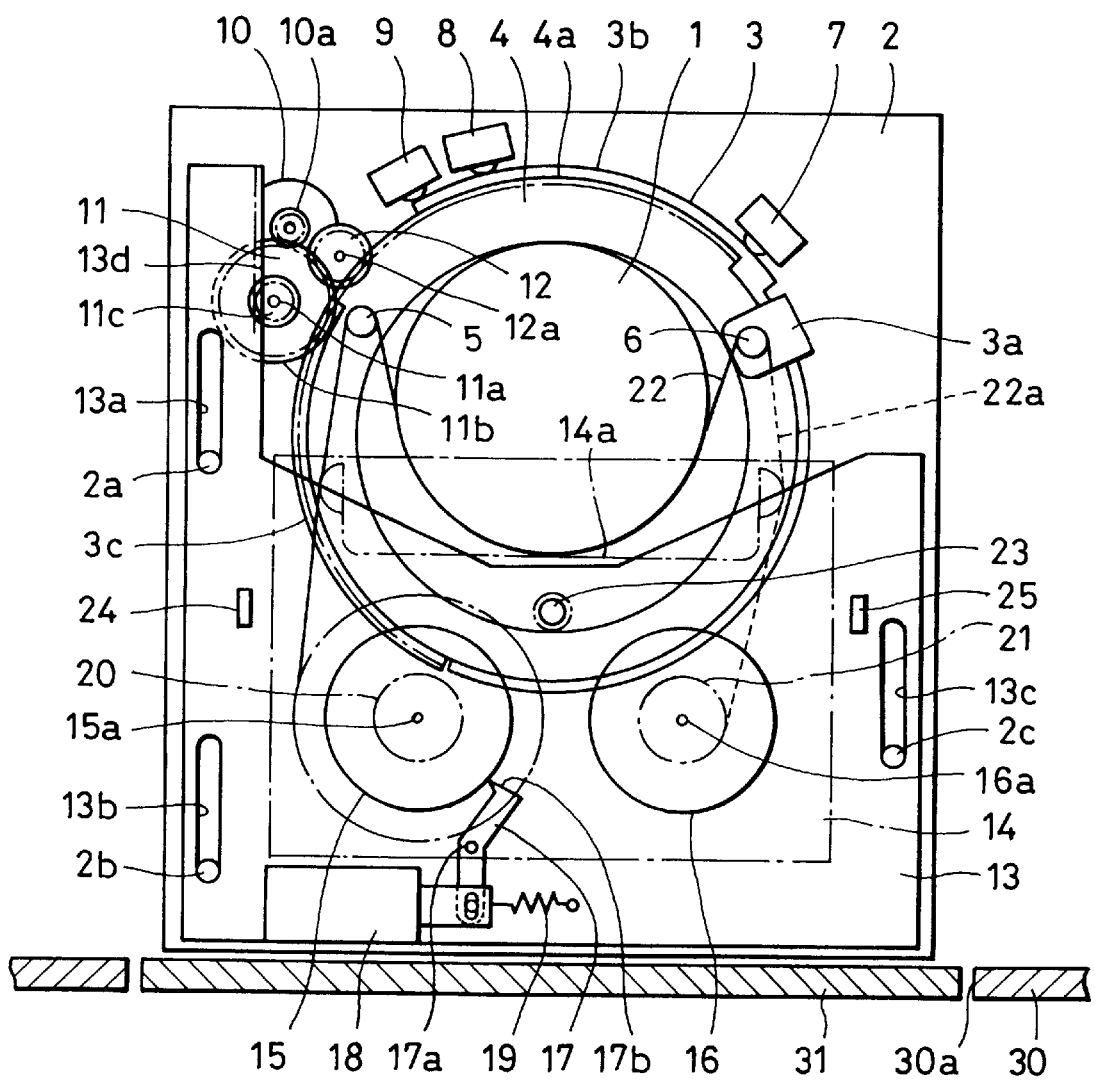
FIG. 5 is a plan view of the whole apparatus showing a state where the tape loading is completed according to the first embodiment of the present invention.
Figure 6:
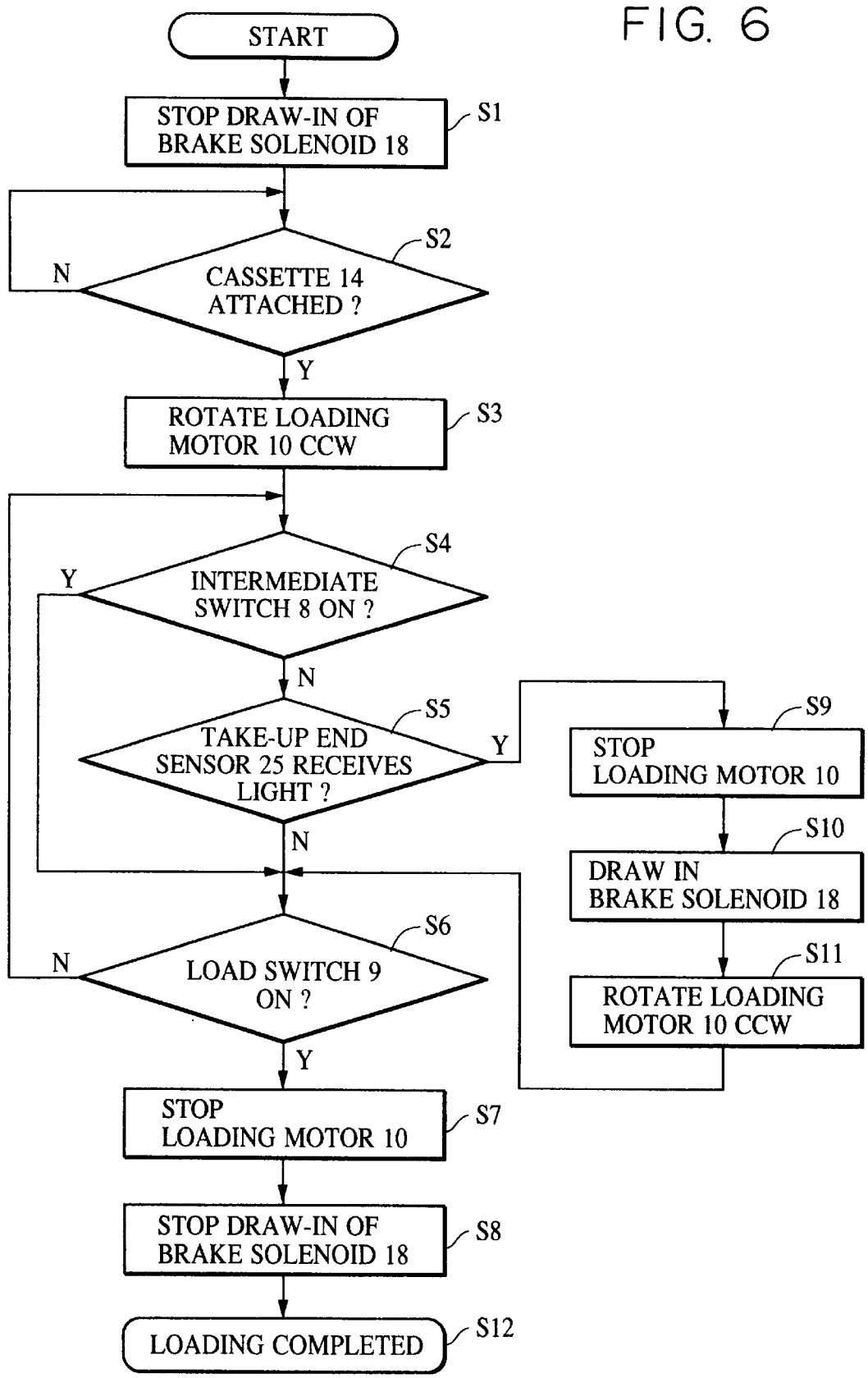
FIG. 6 is a flowchart of a tape loading operation according to the first embodiment of the present invention.

The operation of this embodiment will now be described on the basis of a flowchart of FIG. 6 while referring to FIGS. 1 to 5. FIGS. 4 and 5 are plan views of the whole apparatus showing a state in the course of tape loading and a state of the completion of tape loading, respectively.

Firstly, in the state shown in FIG. 1 where the tape is not loaded, the brake solenoid is not drawn in (S1) and the brake lever 17 is braking the supply reel base 15. When a detection switch 100 detects the attachment of the cassette 14 to the slide chassis 13 (S2), the control circuit 26 allows the loading motor 10 to rotate counterclockwise (S3). Just then, the lower ring 3 starts to rotate in the direction shown by an arrow a through the slide gear 11, and the upper ring 4 starts to rotate in the direction shown by an arrow b through the load gear 12 so that the outgoing side post 6 of the lower ring 3 and the incoming side post 5 of the upper ring 4 abut against the tape 22. The unload switch 7 is turned on due to rotation of the lower ring 3 and drawing of the tape 22 is started.

Since the supply reel base 15 is being braked by the brake lever 17, the tape 22 is drawn out of the take-up reel hub 21 side on the rotatable take-up reel base 16. At the same time, the slide chassis 13 is moved forward in the direction shown by an arrow c which is adjacent to the rotating drum 1.

As shown in FIG. 4, the intermediate switch 8 is turned on (S4) in the course of the tape loading due to rotation of the lower ring 3 so as to bring about a state where a specific condition is detected. As shown in FIG. 5, at the point where the load switch is turned on (S6) by the lower ring 3, the loading motor 10 is stopped (S7) and the draw-in of the brake solenoid 18 is stopped (S8) to complete the tape loading. In the state of completion of tape loading, the slide chassis 13 is completely stored in the apparatus packaging 30 and a part of the rotating drum 1 is relatively inserted into the opening 14a of the cassette 14. The opening 30a of the apparatus enclosure 30 is closed with the packaging cover 31 by the user's operation. In this state, desired recording or reproducing is performed by a magnetic head with respect to the tape 22 wound around the rotating drum 1.

During the tape loading operation as described above, when the take-up end sensor 25 receives light and detects the end of the tape (S5) before the intermediate switch 8 is turned on, the loading motor is stopped once (S9) to draw in the brake solenoid 18 and release the braking of the supply reel base 15 because the length of the tape required for the remaining loading exceeds the remaining portion of the standard tape. In this state, the loading motor 10 is allowed to rotate counterclockwise again (S11) to restart the tape loading. At this time, the tape 22 is also drawn out of the supply reel hub 20 side. At the point where the load switch 9 is turned on as shown in FIG. 5 (S6), the loading motor is stopped (S7) and the draw-in of the brake solenoid 18 is stopped (S8) to complete the tape loading (S12).

On the other hand, after the intermediate switch 8 is turned on, the tape loading operation is continued until it is completed without performing the detecting operation of the end of the tape by the take-up end sensor 25 because the length of the tape required for the remaining loading does not exceed the remaining portion of the standard tape. In this case, by cutting off the power supply to the end sensor 25, a power saving effect can be obtained. Nonperformance of the detecting operation of the end of the tape can be also achieved by stopping the light emission of the light emitting element 23. In this case, the power saving effect is increased. The tape loading operation may be continued until it is completed even if the detecting operation of the end of the tape by the take-up end sensor 25 is allowed to be performed at all times in the course of the tape loading so that the end of the tape is detected by the take-up end sensor 25 after the intermediate switch 8 is turned on.

Figure 10:
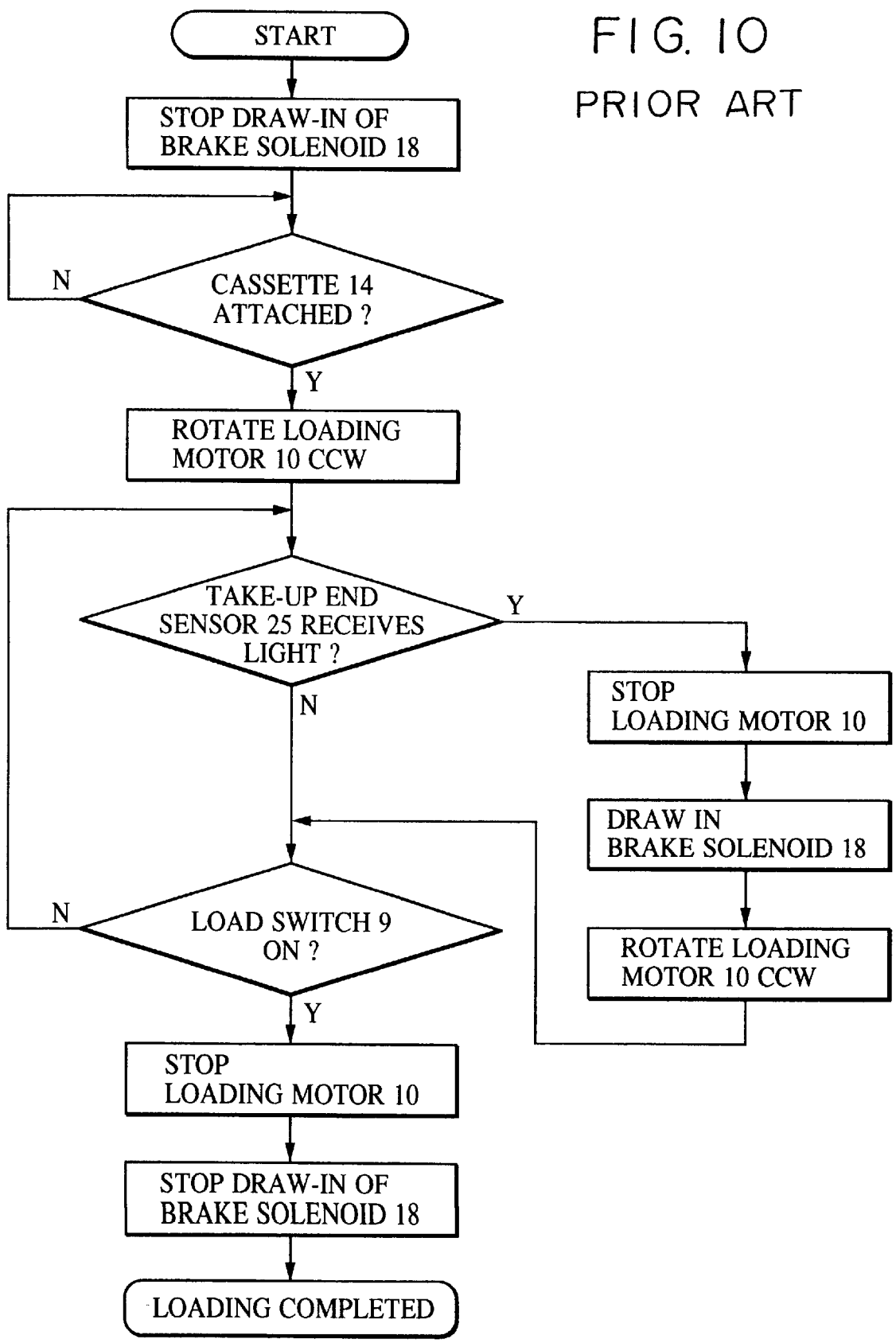
FIG. 10 is a flowchart of a tape loading operation in a conventional VTR.

For comparison, a tape loading operation in a conventional VTR is shown in the flowchart of FIG. 10. In the conventional VTR, the detecting operation of the end of the tape by the take-up end sensor 25 is performed at all times in the course of the loading. When the end of tape is detected, the loading motor 10 is stopped once regardless of the loading position of the tape, and the braking of the supply reel base 15 is released and then, the tape loading is restarted.

In contrast to this, according to this embodiment as described above, a specific condition in the course of the tape loading where the tape portion required for new drawing until the loading is completed becomes less than the remaining tape portion which can be drawn out after the initiation of detecting the end of the tape is detected by the intermediate switch 8 as the rotating position of the lower ring 3, so that the tape loading operation is continued after detecting the specific condition until it is completed regardless of the presence or absence of detection of the end of the tape.

Therefore, since the slide chassis 13 does not stop or move backward in a state of immediately before the tape loading shown in FIGS. 4 to 5, a problem such as mechanism deformation due to abutment of the slide chassis 13 against the enclosure cover 31 will not occur even if the user starts to close the enclosure cover 31 predicting the completion of moving of the slide chassis 13 into the apparatus enclosure 30. Even in the case of a construction in which the slide chassis 13 and enclosure cover 31 are not provided, the detecting operation of the end of the tape is not performed after the specific condition is detected, thereby reducing the loading time.

Figure 7:
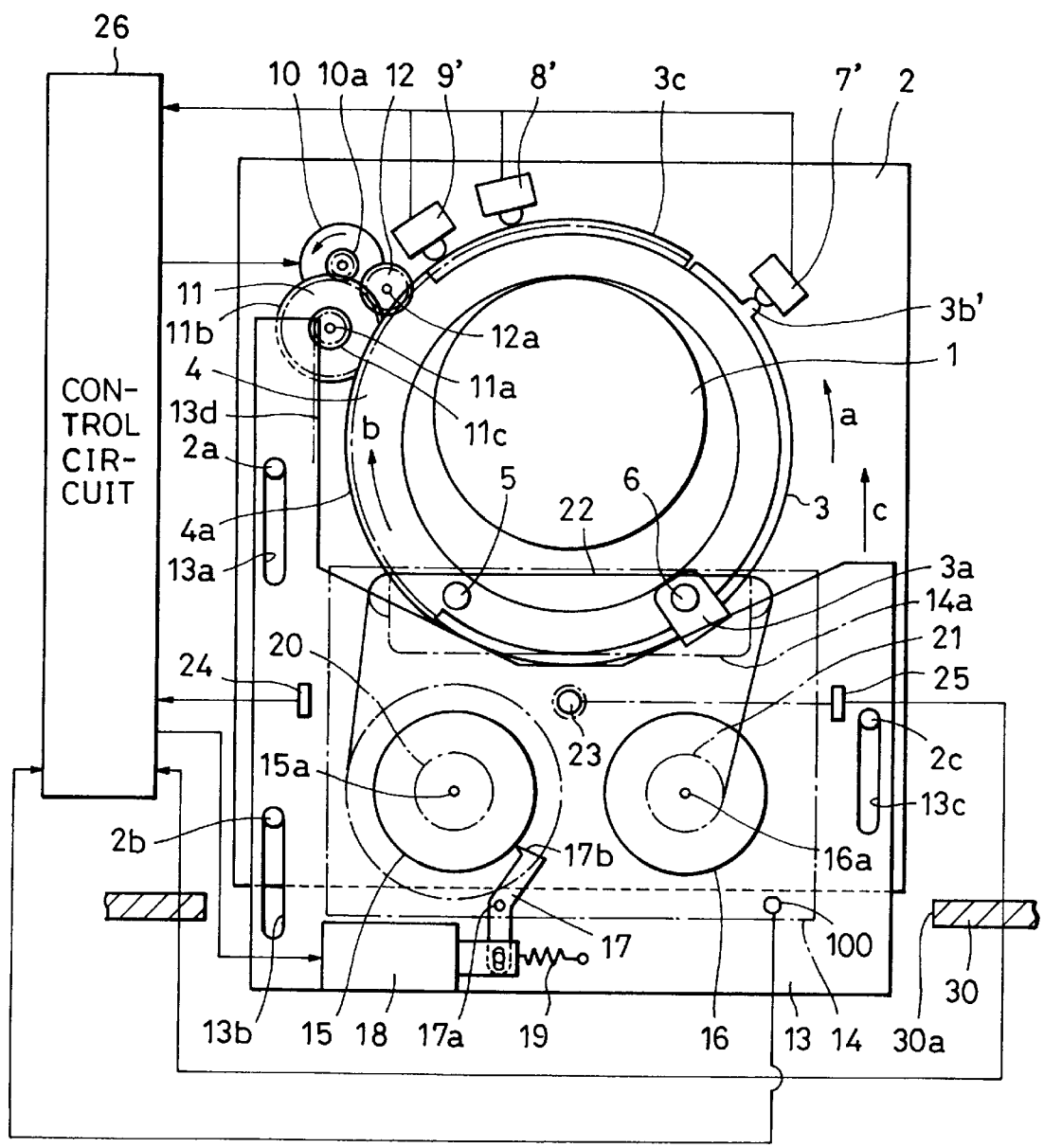
FIG. 7 is a plan view of the whole apparatus showing a state where the tape is unloaded according to a second embodiment of the present invention.
Figure 8:
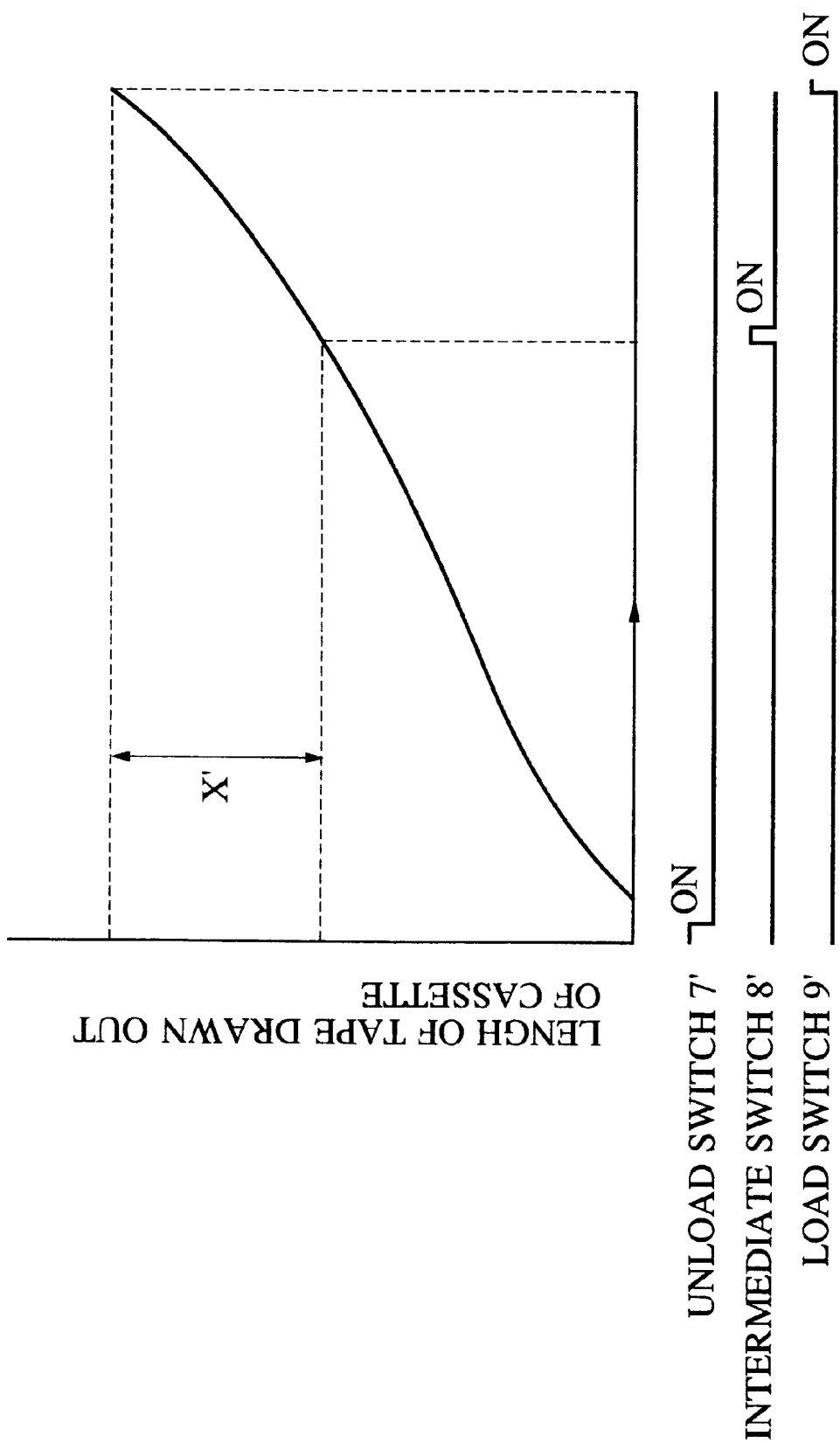
FIG. 8 is an explanatory view showing the relationship between tape loading positions (where switches are actuated) and a length of the tape drawn out of the cassette according to the second embodiment of the present invention.

A second embodiment of the present invention will now be described in FIGS. 7 to 9. The second embodiment differs from the first embodiment in that a protrusion 3b' provided on the outer periphery of the lower ring 3 has a partial shape and turn-on of an intermediate switch 8' does not continue until the tape loading is completed but is made instantly. The relationship between a length of the tape drawn out of the cassette and tape loading positions where the switches 7', 8' and 9' are actuated is shown in FIG. 8. In this embodiment, the length of the tape L which can be drawn out of the cassette 14 after the initiation of detecting the end of the tape and the length of the tape X' which is newly drawn out of the cassette 14 by the completion of the tape loading after the actuation of the intermediate switch 8' are set to satisfy the formula:

$$X' \leq L.$$

Figure 9:
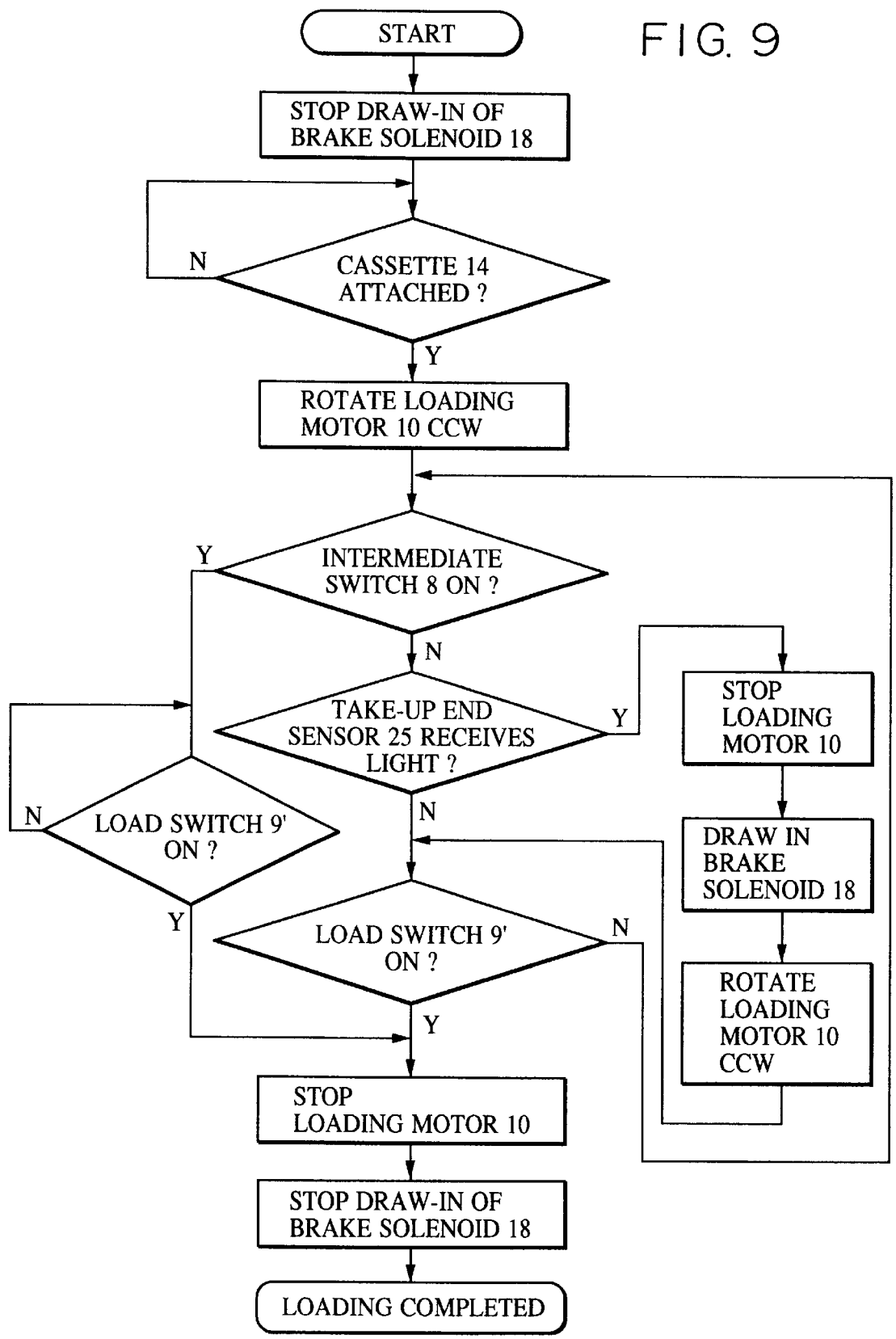
FIG. 9 is a flowchart of a tape loading operation according to the second embodiment of the present invention.

In the second embodiment, once turn-on of the immediate switch 8' is detected, it is not necessary to make sure again that the immediate switch 8' is turned on, as shown in a flowchart of FIG. 9. The flowchart of FIG. 9 is also usable with the first embodiment.

In either embodiment, a tape unloading operation due to take-up of the tape 22 and reverse rotation of the upper and lower rings 3 and 4 may be performed as usual without the provision of the intermediate switch 8 or 8'.

Although the preferred embodiments of the present invention have been described above, the present invention is not limited thereto and various effective modifications and applications can be made based on the technical idea. For example, according to the embodiments, the specific condition in the course of the tape loading is detected by directly abutting the rings for loading against the switches. However, detection of the specific condition can also be effected by a mode selector selecting a series of modes such as reproduction and stop through an addition of a position corresponding thereto.

As described above, according to the embodiments, by detecting the specific condition in the course of the tape loading where the length of the tape to be newly required until the loading is completed becomes shorter than that of the tape which can be drawn out after the initiation of detecting the end of the tape, a temporary stop of the tape loading (or a temporary stop of the tape unloading in some types of VTRs) may be eliminated even if the end of the tape is detected in the latter part of the tape loading. Due to this arrangement, for example, in the case of a construction in which the moving chassis is stored in the apparatus packaging from the opening thereof at the time of the tape loading and the user closes the opening with the enclosure cover, the moving chassis does not stop or move backward due to the detection of the end of the tape even if the user predicts the normal movement of the moving chassis and starts to close the enclosure cover in the latter part of the tape loading, whereby problems such as mechanism deformation and destruction caused by abutment of the enclosure cover against the moving chassis can be solved, thereby remarkably increasing safety in service.

In addition, the detecting operation of the end of the tape is not performed after detecting the specific condition even in the case of a normal construction in which the moving chassis and the enclosure cover as described above are not provided, whereby the tape loading time can be reduced, thereby increasing operability.

What is claimed is:

1. A method of loading a cassette tape having a detectable end, comprising the steps of:

detecting the detectable end of the tape with a tape end detector;

setting a point in the course of tape loading where the length of the tape to be newly drawn out of the cassette until the loading is completed becomes shorter than that of the tape capable of being drawn out of said cassette after the initiation of the detecting step; and continuing the tape loading bypassing the detecting step, and stopping power supply to said tape end detector if the tape loading is started and the tape passes over said point in the course of the tape loading.

2. A method according to claim 1, wherein, when the tape is drawn out of said cassette, one reel is not rotated and the drawing of the tape is performed from the other reel side.

3. A method according to claim 1, wherein the setting step includes the step of setting said point using an intermediate switch.

4. A method according to claim 1, further comprising the step of utilizing a load switch and an unload switch to detect the course of tape loading.

5. A method according to claim 4, further comprising the step of setting said point utilizing a switch disposed intermediate said load switch and said unload switch.

6. A method according to claim 1 wherein the cassette tape is disposed in a slidable chassis which slides into a tape apparatus, and further comprising the step of:

preventing the slidable chassis from moving into an unloading position if the tape loading has started and the tape passes over said point in the course of the tape loading.

7. An apparatus for controlling a tape drawn out of a cassette, comprising:

loading means for loading said tape in order to draw said tape out of said cassette and form a predetermined tape path;

first detection means for detecting an end of the tape drawn out of said cassette;

second detection means for detecting a specific condition in the course of a tape loading where the length of the tape drawn out of said cassette for forming the predetermined tape path becomes shorter than that of the tape capable of being drawn out of said cassette after the initiation of detecting the end of the tape by said first detection means; and control means for continuing the tape loading operation and stopping power supply to said first detection means after the loading of said tape is started by said loading means and said specific condition is detected by said second detection means.

8. An apparatus according to claim 7, wherein said first detection means includes a light emitting element and light receiving elements.

9. An apparatus according to claims 8, wherein said control means causes said light emitting element to not emit light after said specific condition is detected by said second detection means.

10. An apparatus according to claim 8, wherein said control means causes said light receiving elements to not be powered after said specific condition is detected by said second detection means.

11. An apparatus according to claim 7, further comprising a pair of reel bases one of which is put in a non-rotating state by said control means when said tape is drawn out of said cassette.

12. An apparatus according to claim 11 wherein one of said reel bases comprises a tape supply reel base and another of said reel bases comprises a take-up reel base, and wherein said control means causes the tape to be drawn out of the tape take-up reel base.

13. An apparatus according to claim 7, further comprising a fixed chassis provided with a rotating drum and a moving chassis to which said cassette is coupleable and which is reciprocable.

14. An apparatus according to claim 13, further comprising an apparatus enclosure, and wherein said moving chassis protrudes from said enclosure at a time of attachment of said cassette and moves close to said rotating drum at a time of loading of said tape.

15. An apparatus according to claim 14, further comprising an opening in said enclosure for said moving chassis to protrude therethrough.

16. An apparatus according to claim 15, further comprising a cover for covering said opening.

17. Apparatus according to claim 7, wherein said second detection means comprises an intermediate switch.

18. Apparatus according to claim 16, further comprising a load switch and an unload switch for detecting the progress of tape loading.

19. Apparatus according to claim 18, wherein said second detection means comprises a switch disposed intermediate said load switch and said unload switch.

20. Apparatus according to claim 7, further comprising:

a slidable chassis for holding said cassette, said slidable chassis being slidable into and out of a tape apparatus, wherein said control means prevents said slidable chassis from moving to an unloading position after the loading of said tape is started by said loading means and said specific condition is detected by said second detection means.

* * * * *

UNITED STATES PATENT AND TRADEMARK OFFICE
CERTIFICATE OF CORRECTION

PATENT NO. : 5,926,335

DATED : July 20, 1999

INVENTOR(S): JUNJI KOBAYASHI

It is certified that error appears in the above-identified patent and that said Letters Patent is hereby corrected as shown below:

COLUMN 6,
Line 6, delete "of".

COLUMN 8,
Line 11, "claims 8," should read --claim 8,--.

Signed and Sealed this

Thirtieth Day of May, 2000

Attest:

Attesting Officer

Q. TODD DICKINSON

Director of Patents and Trademarks